US012734478B2

(12) United States Patent
Lin et al.

(10) Patent No.: US 12,734,478 B2
(45) Date of Patent: Sep. 15, 2026

(54) INTELLIGENT DRYING DEVICE FOR TRANSFORMER

(71) Applicant: Fortune Electric Co., Ltd., Taoyuan City (TW)

(72) Inventors: Chia-Ching Lin, Taoyuan City (TW); Ching-Min Chen, Taoyuan City (TW)

(73) Assignee: FORTUNE ELECTRIC CO., LTD., Taoyuan City (TW)

(*) Notice: Subject to any disclaimer, the term of this patent is extended or adjusted under 35 U.S.C. 154(b) by 369 days.

(21) Appl. No.: 18/211,668

(22) Filed: Jun. 20, 2023

(65) Prior Publication Data

US 2024/0115991 A1 Apr. 11, 2024

(30) Foreign Application Priority Data

Oct. 11, 2022 (TW) ................................ 111138365

(51) Int. Cl.
*B01D 53/26* (2006.01)
*B01D 53/30* (2006.01)
*H01F 27/14* (2006.01)

(52) U.S. Cl.
CPC ........... *B01D 53/261* (2013.01); *B01D 53/30* (2013.01); *H01F 27/14* (2013.01)

(58) Field of Classification Search
CPC ....... H01F 27/02; H01F 27/14; B01D 53/261; B01D 53/30
See application file for complete search history.

(56) References Cited

U.S. PATENT DOCUMENTS 5,902,381 A * 5/1999 Golner ............... B01D 53/0407 96/108
7,332,015 B2 * 2/2008 Golner ............... B01D 53/0415 96/111
2021/0018197 A1 * 1/2021 Lin ....................... F24F 3/1429

FOREIGN PATENT DOCUMENTS

CN 104280193 A * 1/2015
CN 206210542 U * 5/2017
CN 107491123 A 12/2017
CN 212542119 U 2/2021
CN 215506813 U * 1/2022
JP 2008218136 A * 9/2008

(Continued)

OTHER PUBLICATIONS

English Machine Translation of CN-215506813-U (Year: 2022).*

(Continued)

*Primary Examiner* — Nathan C Zollinger
(74) *Attorney, Agent, or Firm* — Li & Cai Intellectual Property (USA) Office

(57) ABSTRACT

An intelligent drying device for a transformer includes an air dehydrating device and a control device. The air dehydrating device is in air communication with a transformer, and includes a device body, a sensor, and a heater. The device body has a desiccant, and the sensor and the heater are disposed on the device body. The control device is connected to the air dehydrating device, and includes a display module. In use, the air dehydrating device can remove moisture from an air stream by the desiccant when the transformer is in an intake state, and can remove moisture from the desiccant by the heater when the transformer is in an exhaust state. The control device can determine a humidity status level to be displayed on the display module according to air humidity data obtained by the sensor.

6 Claims, 6 Drawing Sheets

(56) References Cited

FOREIGN PATENT DOCUMENTS

| | | | | | |
|---|---|---|---|---|---|
| TW | M525528 | U | * | 7/2016 | |
| TW | I563521 | B | | 12/2016 | |
| TW | 202026573 | A | | 7/2020 | |
| WO | WO-2021024277 | A1 | * | 2/2021 | ............. H01F 27/14 |

OTHER PUBLICATIONS

English Machine Translation of abstract for JP-2008218136-A (Year: 2008).*

English Machine Translation of CN-206210542-U (Year: 2017).*

* cited by examiner

INTELLIGENT DRYING DEVICE FOR TRANSFORMER

CROSS-REFERENCE TO RELATED PATENT APPLICATION

This application claims the benefit of priority to Taiwan Patent Application No. 111138365, filed on Oct. 11, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power transmission and distribution system, and more particularly to an intelligent drying device for a transformer.

BACKGROUND OF THE DISCLOSURE

Moisture ingress into insulation of electrical equipment can cause leakage currents and an increase of dielectric loss, which is one of the main causes of insulation breakdown. Hence, it is necessary to prevent humid air from entering the electrical equipment, so as to ensure safe operation of the electrical equipment. For example, an oil-immersed transformer includes an oil storage tank containing insulating oil. Once the humid air enters the oil storage tank, the insulating oil becomes mixed with water, thereby causing deterioration of the insulating oil and degradation of insulation performance.

In order to keep an interior of the electrical equipment dry, an air dehydrating device is usually installed to remove moisture from air that enters the electrical equipment. The air dehydrating device can absorb the moisture in the air by a desiccant and regenerate the desiccant by a heater. However, in the existing air dehydrating device, the heater is configured to start after a predetermined time interval or after the desiccant approaches or reaches water saturation. As a result, the air dehydrating device may not maintain stable dehumidification performance during the entire operating cycle of the electrical equipment.

In Taiwan, the air in the summer is relatively humid, and thus a period of time for the desiccant to reach water saturation is shorter. On the other hand, the air in the winter is relatively dry, and thus the period of time for the desiccant to reach or approach water saturation is longer. If the heater periodically heats the desiccant by the predetermined time interval, the desiccant may not maintain its ability to absorb moisture in the air for a long period of time, thereby resulting in a shortened insulation life of the electrical equipment. In addition, if the heater is started only after the desiccant reaches or approaches water saturation, this can cause a downtime of the electrical equipment.

In addition, the operating cycle of the electrical equipment may be affected by external environmental factors, but the existing air dehydrating device does not have the ability to respond to changes of the external environmental factors.

SUMMARY OF THE DISCLOSURE

In response to the above-referenced technical inadequacies, the present disclosure provides an intelligent drying device for a transformer, which can allow for normal operation of the transformer via an intelligent control of a heater.

In order to solve the above-mentioned problems, one of the technical aspects adopted by the present disclosure is to provide an intelligent drying device for a transformer, which includes an air dehydrating device and a control device. The transformer has an intake state and an exhaust state. The air dehydrating device is in air communication with the transformer, and includes a device body, a sensor, and a heater. The device body has a desiccant, and the sensor and the heater are disposed on the device body. The control device is connected to the air dehydrating device, and includes a display module. In use, when the transformer is in the intake state, the air dehydrating device is configured to remove moisture from an air stream by the desiccant and obtain air humidity data by the sensor over a predetermined time period. Furthermore, when the transformer is in the exhaust state, the air dehydrating device is configured to remove moisture from the desiccant by the heater. In addition, the control device is configured to determine a humidity status level to be displayed on the display module according to the air humidity data of the predetermined time period.

Therefore, in the intelligent drying device provided by the present disclosure, by virtue of the air dehydrating device being configured to remove moisture from an air stream by the desiccant and obtain air humidity data by the sensor over a predetermined time period when the transformer is in the intake state, the air dehydrating device being configured to remove moisture from the desiccant by the heater when the transformer is in the exhaust state, and the control device being configured to determine a humidity status level to be displayed on the display module according to the air humidity data of the predetermined time period, the intelligent drying device can maintain a stable dehumidification performance during each operation cycle of the transformer, and the control device can provide current humidity status information to the relevant personnel. Accordingly, the transformer can be improved to have high availability.

Furthermore, the intelligent drying device of the present disclosure can dynamically predict activation timing of the heater according to daily variations in air humidity, so as to regenerate the desiccant (i.e., enabling the desiccant to regain its ability to absorb or remove moisture) by heating before the desiccant approaches or reaches water saturation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
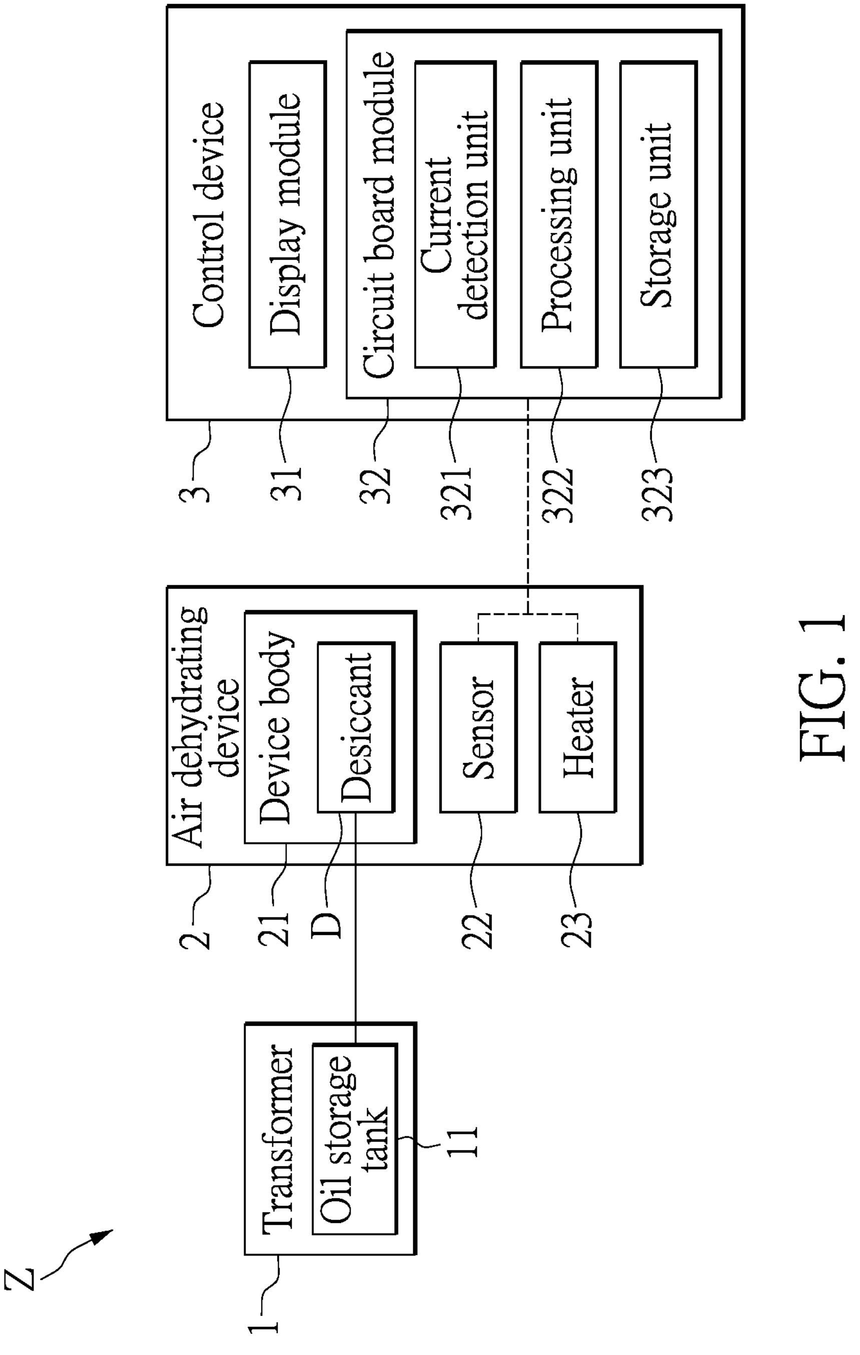
FIG. 1 is a schematic view showing an implementation structure of an intelligent drying device for a transformer according to one embodiment of the pre sent disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 3:
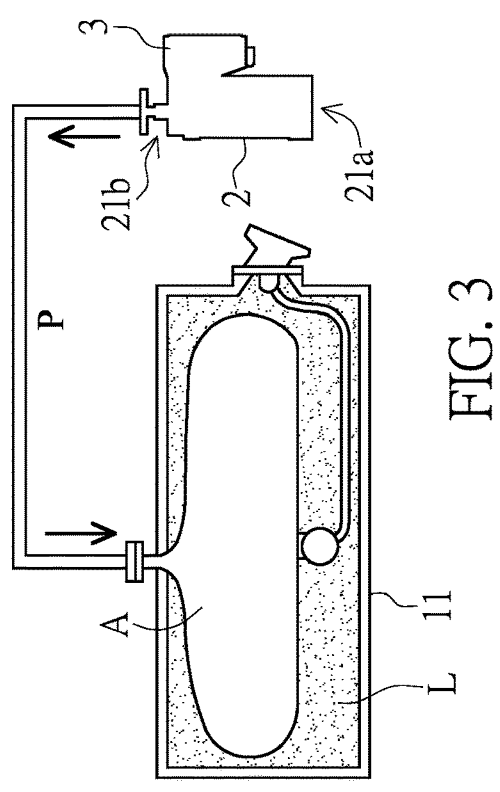
FIG. 3 is a schematic view showing the intelligent drying device and the transformer in another use state according to one embodiment of the present disclosure.
Figure 2:
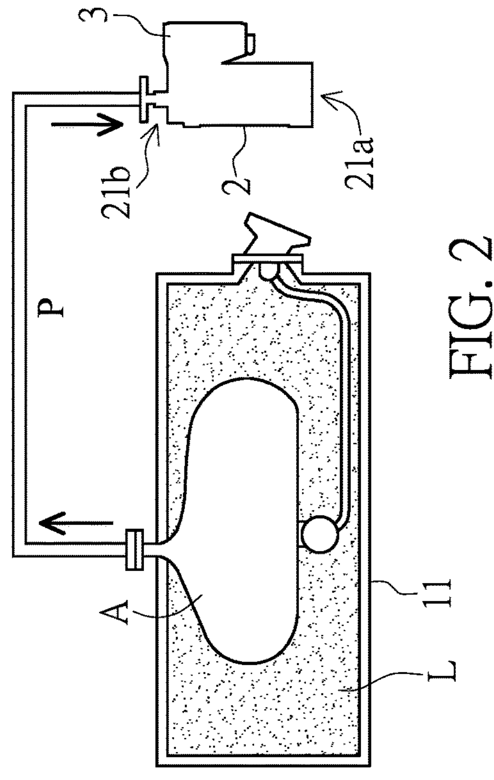
FIG. 2 is a schematic view showing the intelligent drying device and the transformer in one use state according to one embodiment of the present disclosure.
Figure 4:
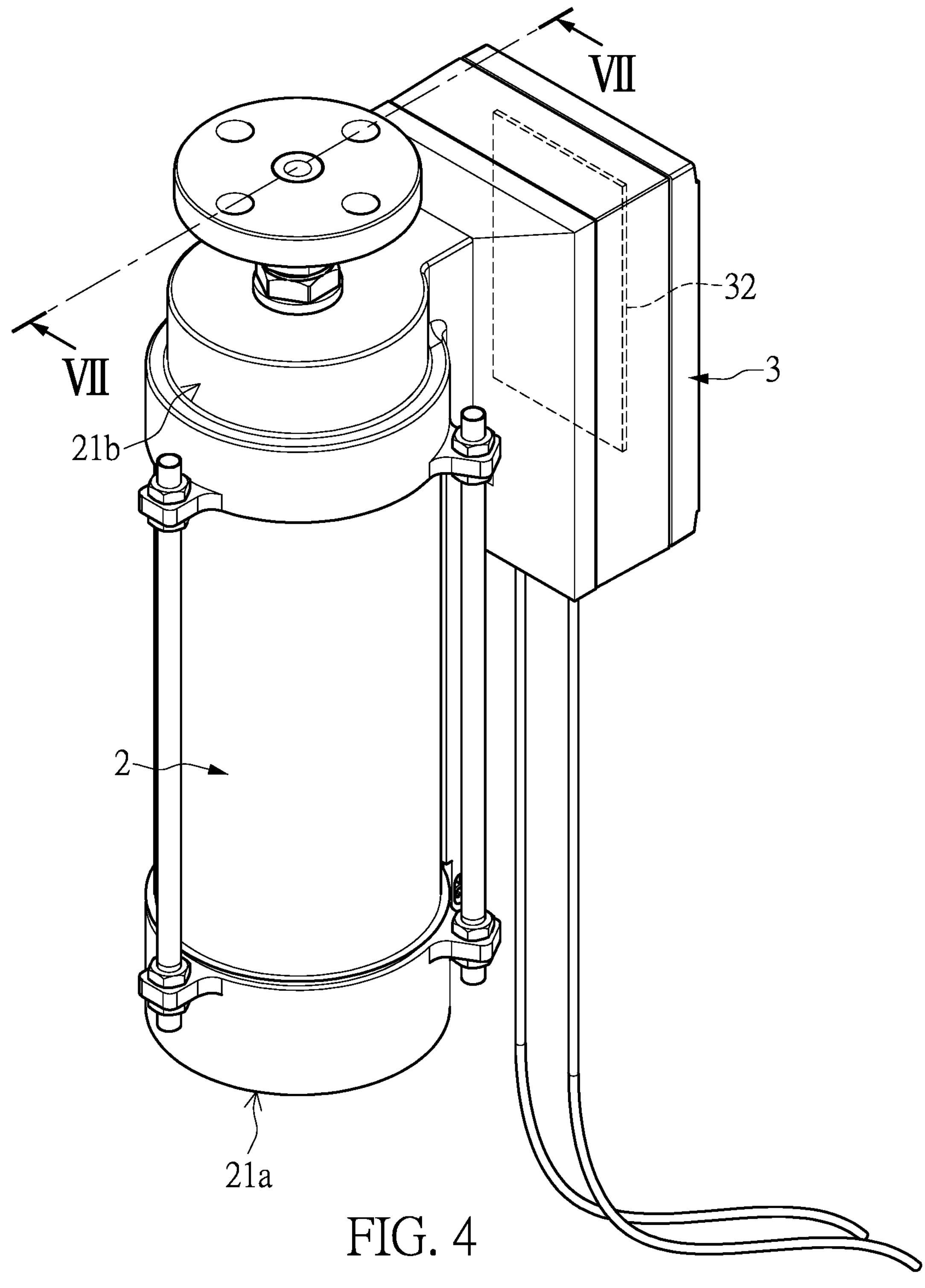
FIG. 4 is a schematic perspective assembled view of the intelligent drying device according to one embodiment of the present disclosure.
Figure 5:
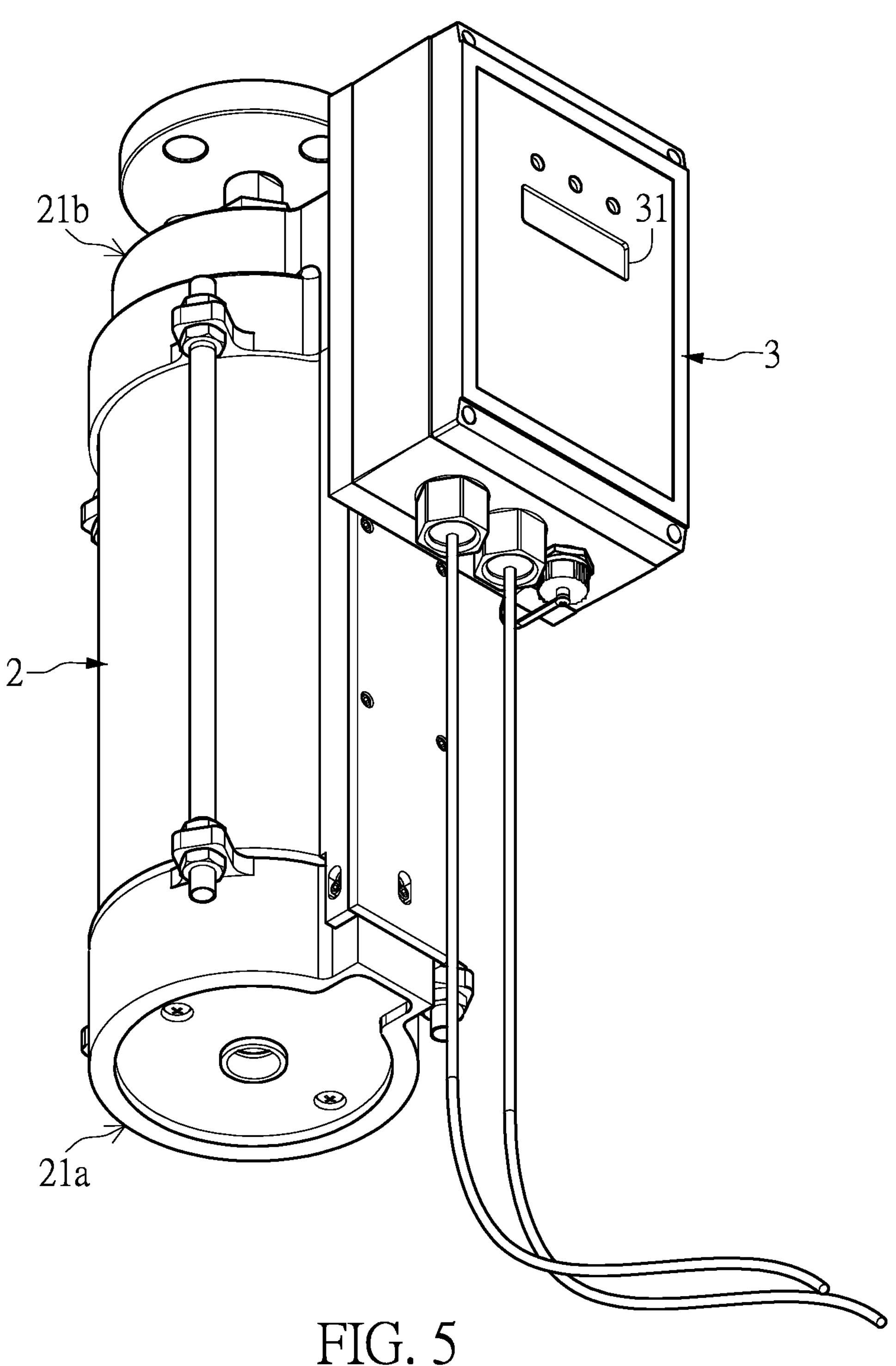
FIG. 5 is another schematic perspective assembled view of the intelligent drying device according to one embodiment of the present disclosure.

FIG. 1 is a schematic view showing an implementation structure of the present disclosure. FIG. 2 and FIG. 3 are schematic views showing different use states of the present disclosure. Referring to FIG. 1 to FIG. 3, one embodiment of the present disclosure provides an intelligent drying device, which is suitable for use with a transformer 1 to form a transformer system Z. The intelligent drying device of the present disclosure includes an air dehydrating device 2 and a control device 3. The air dehydrating device 2 is in air communication with the transformer 1, and the control device 3 is connected to the air dehydrating device 2. In use, the air dehydrating device 2 serves as an important protective component of the transformer 1, and can remove moisture from an external air stream before being drawn into the transformer 1, so as to prevent an insulation strength of the transformer 1 from being reduced due to the moisture. It is worth mentioning that the control device 3 can provide current humidity status information to the relevant personnel (e.g., technical personnel). Accordingly, the transformer 1 can be improved to have high availability.

More specifically, the air dehydrating device 2 includes a device body 21, a sensor 22, and a heater 23. The device body 21 has a desiccant D (such as a silica gel desiccant), and the sensor 22 and the heater 23 are disposed on the device body 21. The control device 3 includes a display module 31. In use, the air dehydrating device 2 can remove the moisture from the air stream by the desiccant D and obtain air humidity data by the sensor 22 over a predetermined time period when the transformer 1 is in an intake state (i.e., drawing in external air). Furthermore, the air dehydrating device 2 can evaporate water in the desiccant D by the heater 23 when the transformer 1 is in an exhaust state (i.e., exhausting internal excess air). According to the air humidity data obtained from the sensor 22, the control device 3 can determine a humidity status level of the air dehydrating device 2 that is in operation, and the humidity status level is to be displayed on the display module 31.

In practice, the air humidity data includes an average value of daily average humidity values of all days within the predetermined time period. In an example of a period of 10 days, the air humidity data includes an average value of daily average humidity values of a first day to a tenth day of the air dehydrating device 2 that is in operation. In the present disclosure, the humidity status level is divided into four levels: a first level, in which the average value is less than 30%, and a current humidity status is indicated as excellent; a second level, in which the average value is greater than or equal to 30% and less than or equal to 45%, and the current humidity status is indicated as great; a third level, in which the average value is greater than 45% and less than or equal to 60%, and the current humidity status is indicated to be good; and a fourth level, in which the average value is greater than 60%, and the current humidity status needs to be checked. However, the humidity status level can have different division numbers according to different criteria, and is not limited to the aforementioned example.

In the present embodiment, as shown in FIG. 2 and FIG. 3, the transformer 1 is an oil-immersed transformer that includes an oil storage tank 11. The oil storage tank 11 has an air cell A therein to isolate an insulating oil from an external environment. Here, one side of the air cell A is in communication with the atmosphere, and another side of the air cell A is in contact with the insulating oil. As used herein, the term "intake state" means that the insulating oil in the oil storage tank 11 contracts in volume as a temperature thereof is decreased, which causes the air cell A to draw in the external air. Conversely, the term "exhaust state" means that the insulating oil in the oil storage tank 11 expands in volume as the temperature thereof is increased, which causes the air cell A to exhaust the internal excess air.

Reference is made to FIG. 4 to FIG. 7. In the air dehydrating device 2, the device body 21 mainly includes a gas inlet end portion 21*a*, a gas outlet end portion 21*b* opposite to the gas inlet end portion 21*a*, and a carrier 24 located between the gas inlet end portion 21*a* and the gas outlet end portion 21*b*. The gas inlet end portion 21*a* is in communication with the atmosphere. The gas outlet end portion 21*b* is in communication with the air cell A by a pipeline P. The carrier 24 (e.g., a mesh) surrounds the heater 23, and the desiccant D is evenly distributed in the carrier 24. In certain embodiments, the oil storage tank 11 is without the air cell A, and the gas outlet end portion 21*b* is in communication with a space above an oil surface. In addition, the sensor 22 is disposed in the gas outlet end portion 21*b*, and can sense immediate changes in both temperature and humidity.

More specifically, when the transformer 1 is in the intake state, the external air enters the device body 21 of the air dehydrating device 2 from the gas inlet end portion 21*a* and comes into contact with the desiccant. After moisture contained in the external air is absorbed and removed by the desiccant, the external air exits from the gas outlet end portion 21*b* to enter the oil storage tank 11 through the pipeline P. During such a process, the sensor 22 can continuously sense temperature and humidity values of air streams. When the transformer 1 is in the exhaust state and the desiccant approaches or reaches water saturation, the heater 23 is started up to remove the moisture absorbed by the desiccant, so as to enable the desiccant to regain its ability to absorb or remove the moisture.

Figure 6:
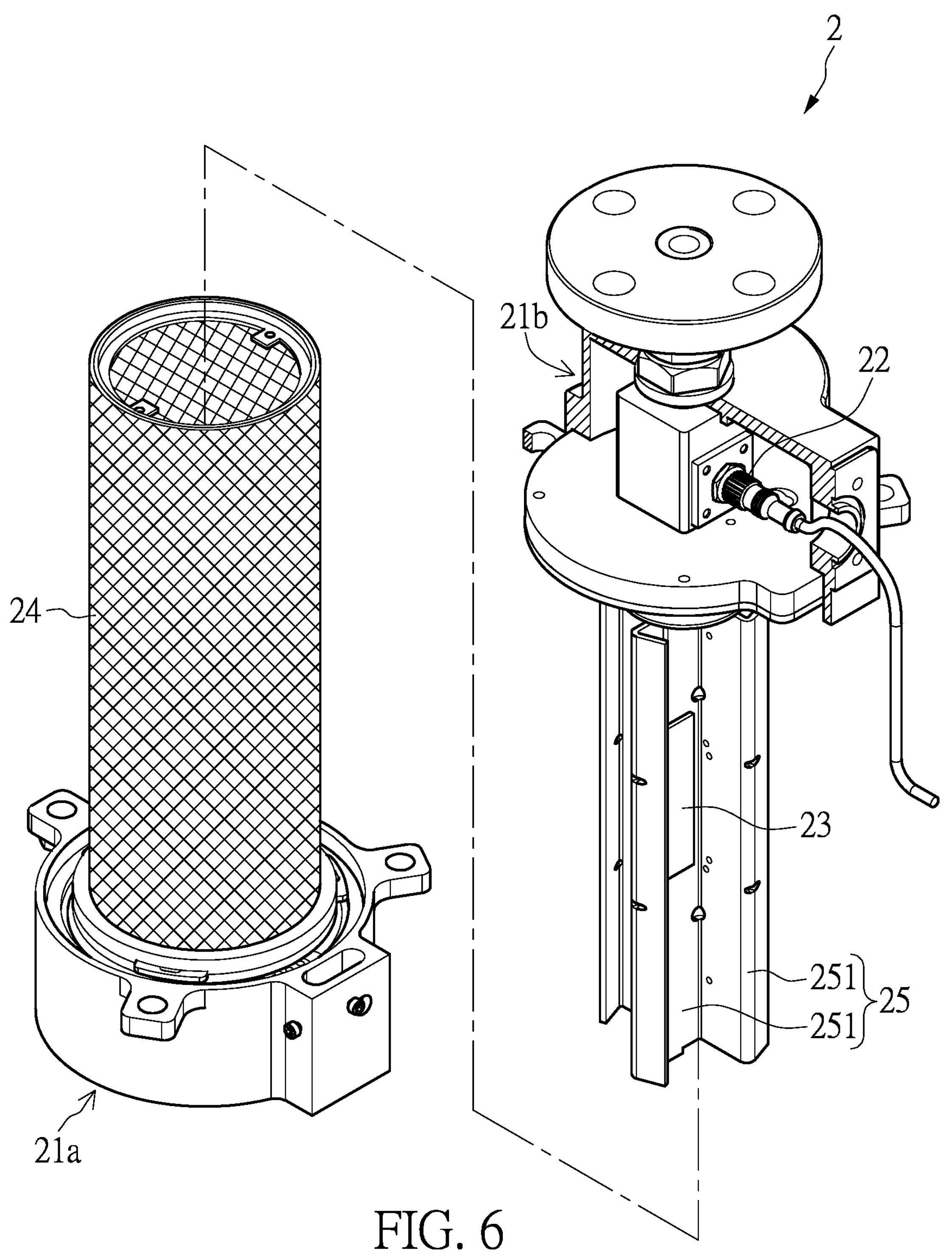
FIG. 6 is a schematic partially exploded perspective view of the intelligent drying device according to one embodiment of the present disclosure.
Figure 7:
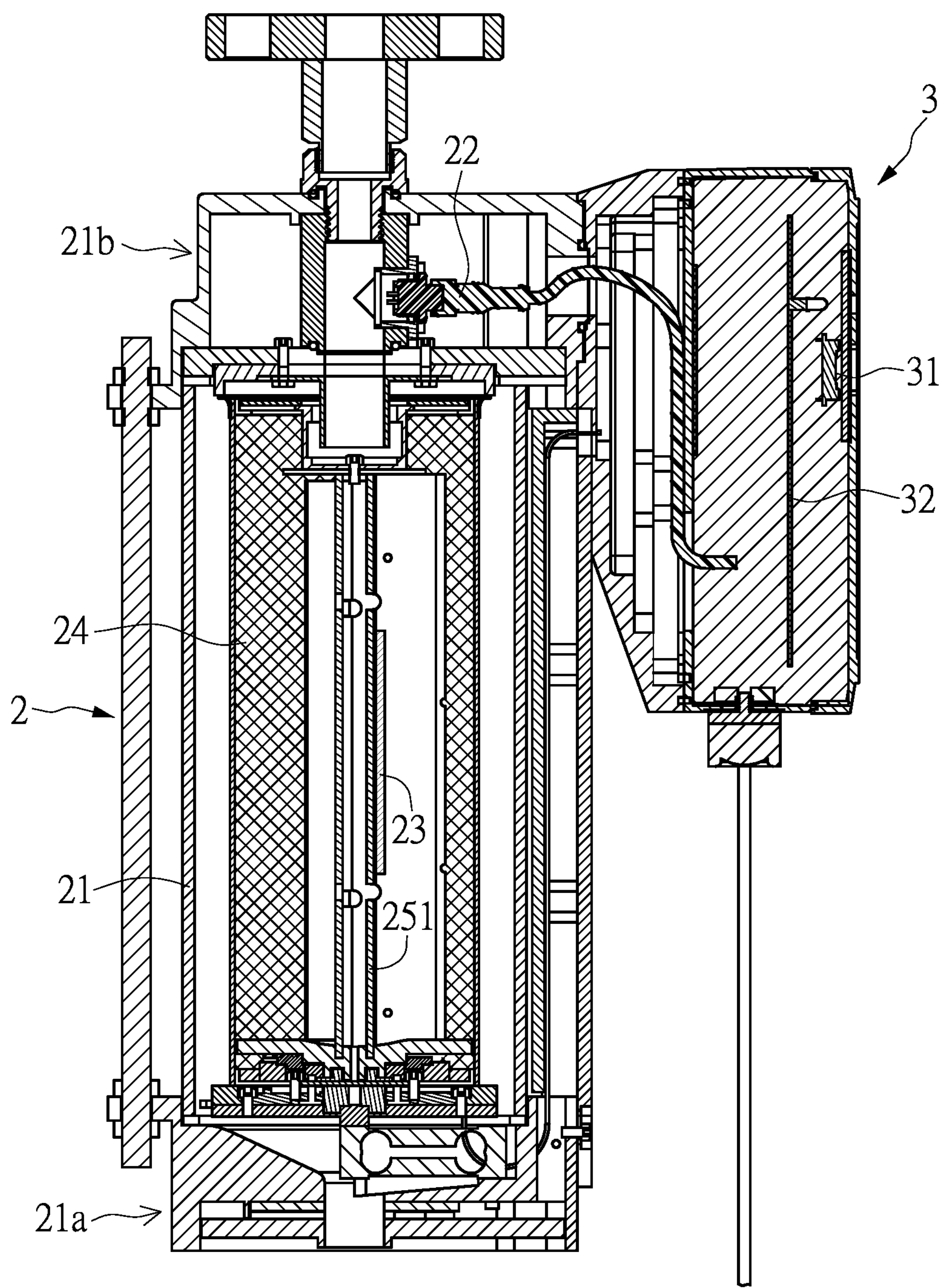
FIG. 7 is a schematic sectional view of the intelligent drying device according to one embodiment of the present disclosure.

As shown in FIG. 6 and FIG. 7, in order to increase the heating effect on the desiccant, the device body 21 of the air dehydrating device 2 further includes a heat conducting structure 25. The heater 23 is disposed on the heat conducting structure 25, and the carrier 24 surrounds the heat conducting structure 25. In practice, the heat conducting structure 25 can include a plurality of heat conducting plates 251 that are integrated into a whole, and the heater 23 is disposed on one of the heat conducting plates 251. However, the aforementioned details are disclosed for exemplary purposes only, and are not meant to limit the scope of the present disclosure.

It is worth mentioning that during the operation of the air dehydrating device 2, the sensor 22 or the heater 23 may have a malfunction which affects the normal function of the air dehydrating device 2. Therefore, the control device 3 has a fault indication function, which allows the relevant personnel (e.g., maintenance personnel) to respond quickly to the malfunction of the sensor 22 or the heater 23.

More specifically, when the sensor 22 obtains a temperature value higher than a predetermined temperature value (e.g., 80° C.), the control device 3 can display a first fault symbol on the display module 31. Alternatively, when the sensor 22 obtains a humidity value higher than a predetermined humidity value (e.g., 100%), the control device 3 can display a second fault symbol on the display module 31. Accordingly, the relevant personnel can be informed about a fault of the sensor 22. The first fault symbol is exemplified by ":", and the second fault symbol is exemplified by ";", but the present disclosure is not limited thereto.

As shown in FIG. 1 and FIG. 7, the control device 3 can include a circuit board module 32 with a current detection unit 321. Accordingly, when the current detection unit 321 obtains a current value lower than a predetermined current value (e.g., 0.1 A), the control device 3 can display a third fault symbol on the display module 31 to inform the relevant personnel about a fault of the heater 23. The third fault symbol is exemplified by "+", but the present disclosure is not limited thereto.

According to particular requirements, lighting or flashing of red, yellow, or green lights can also be implemented for indicating fault information through the display module 31 of the control device 3.

In practice, as shown in FIG. 1, the circuit board module 32 further includes a processing unit 322 and a storage unit 323, so as to realize the functions of the control device 3 mentioned above. For example, the processing unit 322 can determine whether the humidity status level of the air dehydrating device 2 that is in operation is the first, second, third, or fourth level according to the air humidity data (i.e., an average value of daily average humidity values of all days within a predetermined time period) obtained by the sensor 22, and can control the display module 31 to display the humidity status level.

The processing unit 322 can be any type of processors or controllers, an application specific integrated circuit (ASIC), a programmable logic device, or other similar devices. The storage unit 323 can be a memory device (such as a flash read only memory (flash ROM), a random access memory (RAM), or a dynamic random access memory (DRAM)), or any other suitable device. However, such examples should not be taken as limiting the scope of the pre sent disclosure.

In the present disclosure, the control device 3 can perform intelligent control on the heater 23 according to the air humidity data obtained by the sensor 22 (i.e., dynamically predicting activation timing of the heater 23 according to daily variations of air humidity). Specific details are described as follows. The processing unit 322 can analyze and process air humidity data of past N days according to an algorithm, so as to obtain a predicted reference value of a countdown start day. Here, N is an integer greater than or equal to 2. The algorithm is represented by an equation: $Y(N)=\alpha\cdot e\hat{}(\beta\cdot X(N))-(N-1)+K$; where Y(N) represents a predicted reference value of Nth day, X(N) represents an increase amount of daily average humidity of Nth day, $\alpha$ and $\beta$ are empirical constants (which can be obtained according to analysis of large amounts of experimental data), and K represents a weighted index. It should be noted that, when the air dehydrating device 2 is in a damp environment, the weighted index K is a positive value; when the air dehydrating device 2 is in a less humid environment, the weighted index K is 0; when the air dehydrating device 2 is in a drier environment, the weighting index K is a negative value.

In the present embodiment, K is represented by an equation: $e\hat{}(0.102H(N))$, in which H(N) represents a daily average humidity value of Nth day. If the daily average humidity value of the Nth day falls within a first humidity range, K is taken as a positive value. The first humidity range can be between 0% and 15%. If the daily average humidity value of the Nth day falls within a second humidity range, K is taken as 0. The second humidity range can be between 16% and 24%. If the daily average humidity value of the Nth day falls within a third humidity range, K is taken as a negative value. The third humidity range can be greater than 25%. However, the aforementioned details are disclosed for exemplary purposes only, and are not meant to limit the scope of the present disclosure.

The processing unit 322 can compute, starting from the second day of operation of the air dehydrating device 2, the increase amount of daily average humidity every day (i.e., the difference between the daily average humidity value of the current day and the daily average humidity value of the previous day) the air dehydrating device 2, so as to obtain the predicted reference value every day after the second day by the algorithm Afterwards, the processing unit 322 can determine the countdown start day of the heater 23 according to at least one predicted reference value, and the countdown start day can be displayed on the display module 31.

In practice, if the air dehydrating device 2 starts to operate for two days, a predicted reference value of the second day is taken as the countdown start day of the heater 23. If the air dehydrating device 2 starts to operate for more than two days, the processing unit 322 can obtain the countdown start day of the heater 23 according to the following equation:

$$\left[\frac{\text{Sum of predicted reference values of } 2nd \text{ to } Nth \text{ days}}{(N-1)}\right]-(N-1).$$

It should be noted that the humidity level of the environment around the air dehydrating device 2 varies with daily weather conditions, so that predicted results obtained by the processing unit 322 will vary from day to day. For example, on one day, the countdown start day of the heater 23 is predicted to be 10 days (i.e., the heater 23 will be started after 10 days); on the next day, the countdown start day of the heater 23 is predicted to be 12 days; on the day after the next day, the countdown start day of the heater 23 is predicted to be 8 days.

The air dehydrating device 2 can work normally until the countdown start day of the heater 23 is predicted to be less than or equal to 1 day and the processing unit 322 determines that the transformer 1 is in the exhaust state. If the above-mentioned conditions are satisfied, the processing unit 322 immediately starts up the heater 23 to remove moisture from the desiccant by heating. During a heating process, the remaining heating time is displayed on the display module 31.

In practice, the processing unit 322 can determine whether the transformer 1 is in the exhaust state according to temperature data that are obtained by the sensor 22 over a plurality of successive fixed time periods, so as to prevent misjudgment caused by environmental factors (e.g., warming up in the morning). The temperature data includes a plurality of temperature values detected by the sensor 22 at preset time intervals (e.g., 20 seconds) and their average values. More specifically, if an average temperature value of any one of the fixed time periods is greater than an average temperature value of the previous one of the fixed time periods, and the difference between an average temperature value of the last one of the fixed time periods and an average temperature value of the first one of the fixed time periods is greater than or equal to a predetermined value (e.g., 0.5° C.), the processing unit 322 determines that the transformer 1 is in the exhaust state.

Furthermore, if the heater 23 is in an idle state (not started) for a long period of time, the heater 23 must be forced to start for ensuring the ability of the desiccant to absorb or remove moisture. That is, when the heater 23 is in the idle state for a predetermined number of days (e.g., 60 days), the heater 23 will be started up regardless of whether the above-mentioned start conditions are satisfied.

Beneficial Effects of the Embodiments

In conclusion, in the intelligent drying device provided by the present disclosure, by virtue of the air dehydrating device being configured to remove moisture from an air stream by the desiccant and obtain air humidity data by the sensor over a predetermined time period when the transformer is in the intake state, the air dehydrating device being configured to remove moisture from the desiccant by the heater when the transformer is in the exhaust state, and the control device being configured to determine a humidity status level to be displayed on the display module according to the air humidity data of the predetermined time period, the intelligent drying device can maintain a stable dehumidification performance during each operation cycle of the transformer, and the control device can provide current humidity status information to the relevant personnel. Accordingly, the transformer can be improved to have high availability.

Furthermore, the intelligent drying device of the present disclosure can dynamically predict the activation timing of the heater according to the daily variations of the air humidity, so as to regenerate the desiccant (i.e., enabling the desiccant to regain its ability to absorb or remove moisture) by heating before the desiccant approaches or reaches water saturation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An intelligent drying device for a transformer, wherein the transformer has an intake state and an exhaust state, the intelligent drying device comprising:

an air dehydrating device being in air communication with the transformer and including a device body, a sensor, and a heater, the device body having a desiccant, and the sensor and the heater being disposed on the device body; and a control device connected to the air dehydrating device and including a display module;

wherein, when the transformer is in the intake state, the air dehydrating device is configured to remove moisture from an air stream by the desiccant and obtain air humidity data by the sensor over a predetermined time period; wherein, when the transformer is in the exhaust state, the air dehydrating device is configured to remove moisture from the desiccant by the heater;

wherein the control device is configured to determine a humidity status level to be displayed on the display module according to the air humidity data of the predetermined time period;

wherein the air humidity data includes an average value of daily average humidity values of all days within the predetermined time period, and the humidity status level is divided into four levels;

wherein, when the average value is less than 30%, the humidity status level to be displayed on the display module is a first level among the four levels; wherein, when the average value is greater than or equal to 30% and less than or equal to 45%, the humidity status level to be displayed on the display module is a second level among the four levels; wherein, when the average value is greater than 45% and less than or equal to 60%, the humidity status level to be displayed on the display module is a third level among the four levels; wherein, when the average value is greater than 60%, the humidity status level to be displayed on the display module is a fourth level among the four levels;

wherein, when the sensor obtains a temperature value higher than a predetermined temperature value, the control device is configured to display a first fault symbol on the display module;

wherein, when the sensor obtains a humidity value higher than a predetermined humidity value, the control device is configured to display a second fault symbol on the display module; and wherein the control device further includes a circuit board module, and the circuit board module includes a current detection unit; wherein, when the current detection unit obtains a current value lower than a predetermined current value, the control device is configured to display a third fault symbol on the display module.

2. The intelligent drying device according to claim 1, wherein the control device is configured to analyze air humidity data of past N days according to an algorithm, so as to obtain a predetermined countdown start day to be displayed on the display module; wherein N is an integer greater than or equal to 2.

3. The intelligent drying device according to claim 1, wherein the device body includes a gas inlet end portion, a gas outlet end portion opposite to the gas inlet end portion, and a carrier located between the gas inlet end portion and the gas outlet end portion, the sensor is disposed in the gas outlet end portion, the carrier surrounds the heater, and the desiccant is disposed on the carrier.

4. The intelligent drying device according to claim 3, wherein the device body further includes a heat conducting structure, the heater is disposed on the heat conducting structure, and the carrier surrounds the heat conducting structure.

5. The intelligent drying device according to claim 4, wherein the heat conducting structure includes a plurality of heat conducting plates that are integrated together, and the heater is disposed on one of the heat conducting plates.

6. The intelligent drying device according to claim 3, wherein the transformer is an oil-immersed transformer that includes an oil storage tank, and an air cell is disposed inside the oil storage tank to isolate an insulating oil from an external environment; wherein the gas inlet end portion of the device body is in communication with the atmosphere, and the gas outlet end portion of the device body is in communication with the air cell.

* * * * *